July 10, 1951 F. NOE 2,560,183

JOURNAL BOX

Filed Nov. 17, 1948

INVENTOR
FRANK NOE
BY
Mitchell Bechert
ATTORNEYS

Patented July 10, 1951

2,560,183

UNITED STATES PATENT OFFICE 2,560,183

JOURNAL BOX

Frank Noe, Plainville, Conn., assignor to The Fafnir Bearing Company, New Britain, Conn., a corporation of Connecticut Application November 17, 1948, Serial No. 60,550

9 Claims. (Cl. 308—180)

My invention relates to an antifriction bearing housing, and in particular to a bearing housing to be supported between pedestal-type guides, as in the case of a passenger-car railway bearing.

In bearings of the character indicated, it has been the practice to use castings or special forgings for virtually all the parts. In castings there is a substantial wastage of material in order to provide assurance for the requisite strength in the presence of blowholes and other imperfections of casting. Aside from the common defects of casting, the present fabrication methods for this type of bearing call for extensive machining operations.

It is, accordingly, an object of my invention to provide an improved bearing construction of the character indicated.

It is another object to provide an improved bearing construction wherein substantially all the parts may be fabricated of sheet material and in which the use of castings may be minimized.

It is a further object to provide an improved antifriction bearing assembly utilizing parts welded to each other.

It is the general object to achieve the above objects with a light yet strong, inexpensive and readily fabricated construction.

Figure 1:
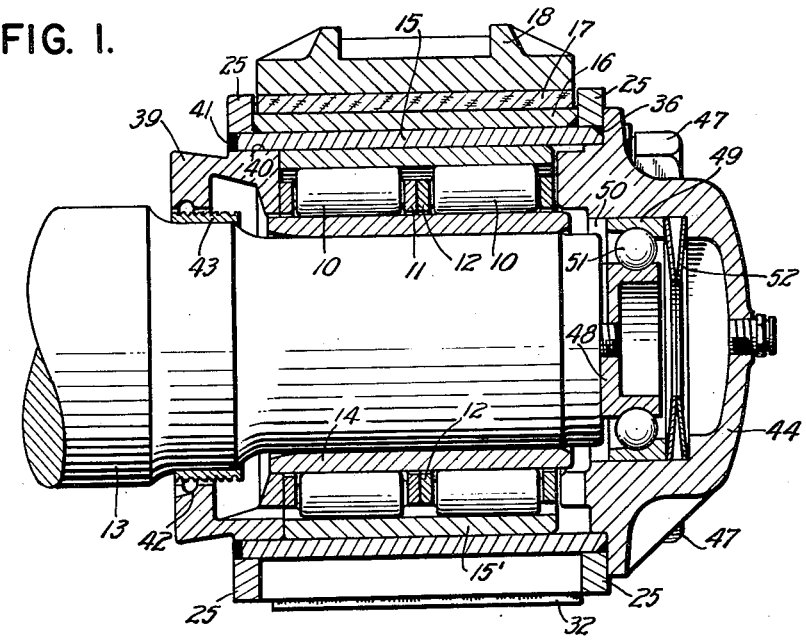
Figure 2:
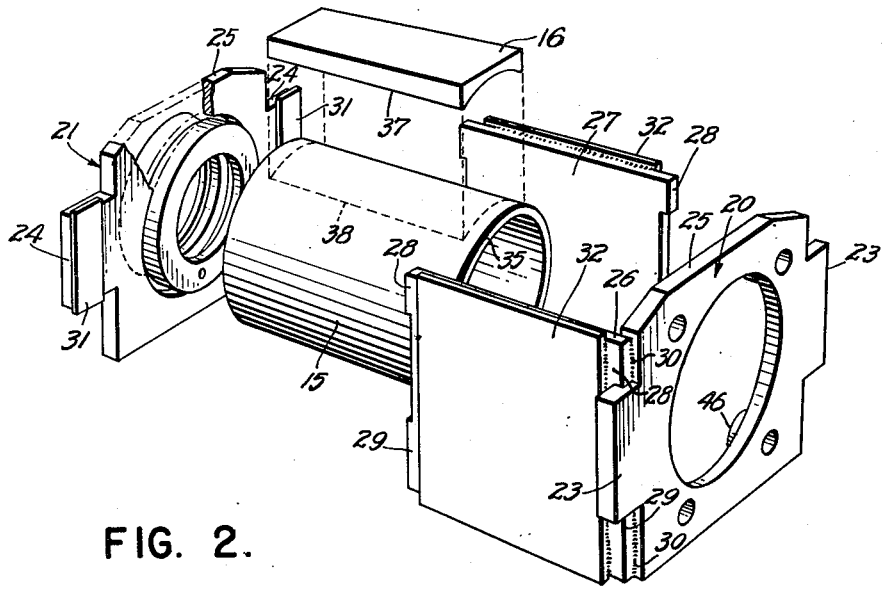

Other objects and various further features of the invention will be pointed out, or will occur to those skilled in the art, from a reading of the following specification in conjunction with the accompanying drawings. In said drawings, which show, for illustrative purposes only, a preferred form of the invention:

Fig. 1 is a vertical, sectional view through a railway-type bearing incorporating features of the invention and shown supporting a railway axle; and Fig. 2 is an exploded view in perspective of certain parts of the bearing housing of the construction of Fig. 1.

Briefly stated, my invention contemplates an improved bearing construction within a housing that may be built around a generally longitudinally extending sleeve. End plates may have openings to fit over and axially to overlap spaced parts of the sleeve, and these end plates may be secured to the sleeve, as by welding. Side plates on opposite sides of the sleeve may extend between the end plates and may be welded to said end plates. A saddle for sustaining the radial load on the bearing may ride on the sleeve between the end plates, and, if desired, the saddle may be secured in this position. If desired, the end plates may include projections extending outwardly beyond the side plates, and suitable shoes or wear plates may be applied to faces of these projections and to the outer faces of the side plates for abutment with the supporting pedestals or shears of the mounting to which the bearing assembly is to be applied.

Referring to the drawings, my invention is shown in application to a railway-type bearing of the passenger-car type, wherein the bearing may float and be vertically guided between pedestal shears and wherein the radial load may be sustained on a saddle. The bearing may include a plurality of rows of antifriction elements, such as rollers 10 angularly spaced and retained as by retainer means 11. The antifriction elements 10 may ride directly upon the journal end 12 of a railway axle 13, or a separate cylindrical sleeve 14 may ride upon the said journal end 12 and have a suitably finished outer surface to serve as the inner raceway for the anti-friction elements 10. The outer raceway may be provided by a second sleeve 15 forming part of the bearing housing, but in the form shown I employ an additional sleeve 15' within the housing sleeve 15 to serve as the outer bearing ring. The sleeve 15 may be of sheet material, rolled to shape, and welded on a longitudinal seam that is preferably on the underside of the assembly; alternatively, the sleeve 15 may be of tubular stock. The sleeve 15 may support a saddle 16 to sustain radial loads, and a layer 17 of suitable insulating material such as Fabreeka may be interposed between a loading shoe 18 and the saddle 16 in accordance with common practice.

In accordance with a feature of the invention a strong yet relatively light and easily fabricated housing may be built around the outer raceway element or sleeve 15. The housing may include two end or flange plates 20—21 at least one of which may have an opening therein; in the form shown, both plates 20—21 have such openings, and these openings are preferably of the outside diameter of the sleeve to permit the end plates 20—21 to fit over and axially to overlap end parts of the sleeve 15. Suitable securing means may be employed to extend between plates 20—21 for holding plates 20—21 together. The end plates 20—21 may be substantially identical and include radially outward side projections or flanges 23 (on the plate 20) and 24 (on the plate 21). The end plates 20—21 may include a further projecting portion 25 extending generally upwardly beyond the upper limit of the saddle 16 in order to serve a locating function for the loading shoe 18 and for the insulating material 17.

In order to derive proper guided support between the pedestal shears of the truck or the like to which my bearing is to be applied and also to serve the above-mentioned securing function for holding plates 20—21 together, I provide side plates 26—27 to be secured at each end thereof to the end plates 20—21. I prefer that these side plates shall include longitudinal projections 28—29 to interlock with the radially outward projections 23—24 of the end plates and thus to provide a more rigid assembly. The side plates 26—27 may be secured to the end plates by welding (see Fig. 2 at 30).

For locating purposes I prefer that the outwardly extending flanges 23—24 on the end plates 20—21 shall extend outwardly of the side plates 26—27. For the illustrated case of a railway bearing wherein side thrust on the bearing housing need only be sustained for one direction of thrust, suitable wear plates or shoes 31 may be secured, as by braising or welding to one pair of end-plate flanges, as to the flanges 24 on end plate 21. In a similar manner, wear plates 32 may be braised, welded or otherwise secured to the side plates 26—27 for receiving the sliding wear in the pedestal guides.

All the parts which have thus far been described as constituting the bearing housing may be permanently secured to each other by simple welding processes. For example, the sleeve 15 may be formed with chamferred edges at the outer ends, as at 35, so that when an end plate such as the end plate 20 is mounted over said chamferred end, the chamfer 35 will, in effect, provide a groove in which to apply the desired weld, as at 36. In like manner, the outer edges or lips 37 of the saddle 16 may be beveled so as to provide a suitable groove (when the saddle 16 is applied to the sleeve 15) in which to lay down full longitudinally extending welds between the saddle 16 and the sleeve 15, as indicated schematically by the dotted line 38 on the sleeve 15 in Fig. 2.

To complete the welded assembly of the housing, an inner seal or retainer ring 39 may be formed with an outer surface 40 closely to fit the sleeve 15, so that when inserted in the sleeve 15 it may be circumferentially welded, as at 41, to the rest of the welded housing assembly. The ring 39 may include a drain groove 42 to cooperate with the conventional grooves of a dirt-and-water flinger seal ring 43 riding on the axle 13.

For purposes of accommodating an end cover or cap 44, my bearing housing preferably includes means on the axially outer end flange or plate member 20 to receive securing means for securing the cover 44. For this purpose I show a plurality of bosses 46 which may be welded to the inside surface of the end plate 20 and which may be threaded to receive securing bolts 47 for the cover 44.

To complete the bearing assembly I prefer to employ antifriction thrust-bearing means capable of sustaining end shocks on the axle 13. Such thrust-bearing means may include an inner ring 48 in end abutment with the axle 13, an outer ring 49 slidably guided within an axial counterbore 50 in the cover 44, and antifriction elements 51 between said rings. Resilient means, such as a pair of oppositely dished frusto-conical spring washers 52, may be supported between the outer ring 49 and the bottom of the counterbore 50. Thrust-bearing means of the character described have been treated in greater detail in the co-pending patent application of H. R. Reynolds Serial No. 16,060, filed March 20, 1948.

It will be appreciated that I have described a relatively simple and easily fabricated bearing assembly incorporating a novel housing. The housing may utilize substantially only sheet-metal parts and may thus employ higher strength materials than those conventionally used. The novel interlocking relationship of these housing parts will be appreciated as providing the utmost in rigidity and the best possible distributed support for bearing loads. I have shown how adequate means may be included in my bearing construction for sustaining wear due to side thrusts and to end thrusts.

While I have described my invention in detail for the preferred form shown it will be understood that modifications may be made within the scope of the invention as defined in the claims which follow.

I claim:

1. In an antifriction bearing housing of the character indicated, a longitudinally extending sleeve within which antifriction bearing means is to be supported, a saddle on said sleeve for sustaining a radial load, an end plate secured to each end of said sleeve and having projections radially outward of said sleeve, each said end plate having a bore in which said sleeve is received, and side plates on opposite sides of said sleeve and including means engaging said projections.

2. In an antifriction bearing housing of the character indicated, a longitudinally extending sleeve within which antifriction bearing means is to be supported, a saddle on said sleeve for receiving and distributing a radial load, generally parallel side plates on opposite sides of said sleeve and including longitudinal projections at both ends thereof, and end plates secured to and axially overlapping each end of said sleeve and including means engaging said projections.

3. In an antifriction bearing housing of the character indicated, a sleeve, end plates cut out to fit over and axially to overlap end parts of said sleeve, said end plates including generally radially outward projections on generally opposite sides thereof, side plates joining said end plates on said opposite sides of said sleeve and including longitudinal projections in interlocking engagement with the projections of said end plates, the projections of one of said end plates extending outwardly of said side plates.

4. A bearing housing according to claim 3, in which wear plates are secured to said last-mentioned outwardly projecting portions.

5. In a bearing housing of the character indicated, a sleeve, end plates having openings to fit over and axially to overlap spaced parts of said sleeve, side plates extending between said end plates, and interlocking projections on said side plates and on said end plates for supporting said side plates from said end plates.

6. In an antifriction bearing assembly of the character indicated, a cylindrical sleeve, a second sleeve located within said first sleeve, antifriction elements between said sleeves, end plates supported on said first sleeve, side plates joining said end plates on opposite side of said sleeves, a saddle on said first sleeve and between said end plates, and retaining means extending radially inwardly from said first sleeve and overlapping both axial ends of said antifriction elements.

7. A bearing assembly according to claim 6, in which said retaining means at one axial end is removable, and in which thrust-bearing means is supported within said removable retaining means, said thrust-bearing means including a part thrustingly to engage the axle upon which said inner sleeve is mounted.

8. In an antifriction bearing housing of the character indicated, a sleeve, a saddle shorter than said sleeve and riding said sleeve with parts of said sleeve projecting from both ends of said saddle, end flange plates over the projecting ends of said sleeve and welded to said sleeve for abutment with the ends of said saddle, and side plates interlockingly joining said flange plates, whereby said flange plates and said side plates may be inherently self-supporting with minimum reliance upon welding support.

9. In a bearing housing of the character indicated, a sleeve, end plates cut out to fit over and axially to overlap end parts of said sleeve, side plates joining said end plates on opposite sides of said sleeve, and endwise retaining means for antifriction means to be accommodated in said sleeve and retaining means including an end ring extending radially inwardly of said sleeve and fitting in one end of said sleeve and secured to said sleeve.

FRANK NOE.

REFERENCES CITED

The following references are of record in the file of this patent:

UNITED STATES PATENTS

| Number | Name | Date |
|---|---|---|
| 2,133,024 | Gibbons | Oct. 11, 1938 |
| 2,273,510 | Brauer | Feb. 17, 1942 |
| 2,448,655 | Bowen | Sept. 7, 1948 |